United States Patent
Kim et al.

(10) Patent No.: US 9,513,018 B2
(45) Date of Patent: Dec. 6, 2016

(54) METHOD FOR CONTROLLING A PARALLEL OPERATION OF A MULTI-WATER HEATER

(75) Inventors: Si-Hwan Kim, Incheon (KR); Changheoi Heo, Seoul (KR)

(73) Assignee: KYUNGDONG ONE CORPORATION, Seoul (KR)

( * ) Notice: Subject to any disclaimer, the term of this patent is extended or adjusted under 35 U.S.C. 154(b) by 259 days.

(21) Appl. No.: 13/392,920

(22) PCT Filed: Oct. 21, 2010

(86) PCT No.: PCT/KR2010/007246
§ 371 (c)(1),
(2), (4) Date: Feb. 28, 2012

(87) PCT Pub. No.: WO2012/053680
PCT Pub. Date: Apr. 26, 2012

(65) Prior Publication Data
US 2012/0160472 A1      Jun. 28, 2012

(51) Int. Cl.
*F24H 9/20*     (2006.01)
*F24H 1/10*     (2006.01)
(Continued)

(52) U.S. Cl.
CPC ........... *F24D 12/02* (2013.01); *F24D 19/1009* (2013.01); *F24D 2200/043* (2013.01); *F24D 2200/32* (2013.01); *Y02B 30/14* (2013.01)

(58) Field of Classification Search
None
See application file for complete search history.

(56) References Cited

U.S. PATENT DOCUMENTS 2,083,612 A * 6/1937 Midyette, Jr. ............... 236/1 E
2,780,206 A * 2/1957 La Rocque et al. ....... 122/448.3
(Continued)

FOREIGN PATENT DOCUMENTS

JP     S64-014524       1/1989
JP     H03-011261 A     1/1991
(Continued)

OTHER PUBLICATIONS

English language Abstract for JP S64-014524.
(Continued)

*Primary Examiner* — Gregory Huson
*Assistant Examiner* — Eric Gorman
(74) *Attorney, Agent, or Firm* — Novick, Kim & Lee, PLLC; Jae Youn Kim

(57) ABSTRACT

A method for controlling a parallel operation of a multi-water heater in which a plurality of water heaters are connected to each other in parallel, according to the present invention, comprises: measuring the temperature of direct water that flows into the multi-water heater; sensing a set temperature set by a user; calculating a temperature difference between the set temperature and the direct water temperature; and changing a reference value to additionally operate or stop each water heater according to the calculated temperature difference, thereby efficiently operate the multi-water heater even though the circumstance and conditions of use are changed.

2 Claims, 3 Drawing Sheets

(51) Int. Cl.
*F24H 9/18* (2006.01)
*F24D 12/02* (2006.01)
*F24D 19/10* (2006.01)
*F24H 1/22* (2006.01)
*F22B 35/00* (2006.01)
*F24H 3/06* (2006.01)
*G05D 23/00* (2006.01)
*F22B 37/42* (2006.01)

(56) References Cited

U.S. PATENT DOCUMENTS

| | | | | |
|---|---|---|---|---|
| 3,400,374 A * | 9/1968 | Schumann | ................... | 700/278 |
| 4,337,893 A * | 7/1982 | Flanders et al. | ................... | 237/7 |
| 4,459,143 A * | 7/1984 | Nawata et al. | ................... | 62/657 |
| 4,511,790 A * | 4/1985 | Kozak | ................... | 219/486 |
| 4,694,783 A * | 9/1987 | Cleer, Jr. | ................... | 122/448.3 |
| 4,819,587 A * | 4/1989 | Tsutsui et al. | ................... | 122/448.1 |
| 4,864,972 A * | 9/1989 | Batey et al. | ................... | 122/448.3 |
| 4,920,252 A * | 4/1990 | Yoshino | ................... | 219/497 |
| 4,922,861 A * | 5/1990 | Tsutsui et al. | ................... | 122/448.1 |
| 5,797,358 A * | 8/1998 | Brandt et al. | ................... | 122/448.1 |
| 5,866,880 A * | 2/1999 | Seitz et al. | ................... | 219/483 |
| 6,059,195 A * | 5/2000 | Adams | ................... | F24H 9/2035 236/20 R |
| 6,062,485 A * | 5/2000 | Stege et al. | ................... | 237/2 A |
| 6,080,971 A * | 6/2000 | Seitz et al. | ................... | 219/483 |
| 6,848,623 B2 * | 2/2005 | Weimer et al. | ................... | 236/11 |
| 7,506,617 B2 * | 3/2009 | Paine | ................... | 122/448.3 |
| 7,651,034 B2 * | 1/2010 | Weimer et al. | ................... | 236/11 |
| 8,251,297 B2 * | 8/2012 | Pouchak et al. | ................... | 237/16 |
| 2002/0002834 A1 * | 1/2002 | Kuroki | ................... | F24D 19/1054 62/238.6 |
| 2002/0195068 A1 * | 12/2002 | Ichinose et al. | ................... | 123/41.14 |
| 2004/0176858 A1 * | 9/2004 | Kuwahara et al. | ................... | 700/9 |
| 2004/0177817 A1 * | 9/2004 | Bradenbaugh | ................... | 122/13.01 |
| 2005/0072174 A1 * | 4/2005 | Beers | ................... | 62/228.1 |
| 2005/0230490 A1 * | 10/2005 | Pouchak et al. | ................... | 237/81 |
| 2005/0230491 A1 * | 10/2005 | Pouchak et al. | ................... | 237/81 |
| 2007/0183758 A1 * | 8/2007 | Bradenbaugh | ................... | 392/478 |
| 2008/0022946 A1 * | 1/2008 | Inami et al. | ................... | 122/14.21 |
| 2008/0023961 A1 * | 1/2008 | Cho | ................... | F25B 27/02 290/2 |
| 2008/0179415 A1 * | 7/2008 | Johnson | ................... | F24D 12/02 237/8 A |
| 2008/0179416 A1 * | 7/2008 | Johnson et al. | ................... | 237/8 A |
| 2009/0064944 A1 * | 3/2009 | Paine | ................... | 122/14.22 |
| 2010/0004786 A1 * | 1/2010 | Paine | ................... | 700/275 |
| 2010/0006042 A1 * | 1/2010 | Pitonyak et al. | ................... | 122/448.3 |
| 2010/0155386 A1 * | 6/2010 | Caves et al. | ................... | 219/441 |
| 2010/0258194 A1 * | 10/2010 | Kim | ................... | 137/1 |
| 2010/0270385 A1 * | 10/2010 | Kim | ................... | 237/81 |
| 2011/0033585 A1 * | 2/2011 | Wasmuht | ................... | C12C 13/00 426/231 |
| 2012/0046801 A1 * | 2/2012 | Mori et al. | ................... | 700/300 |
| 2012/0057857 A1 * | 3/2012 | Kenney | ................... | F24H 1/142 392/465 |
| 2012/0090341 A1 * | 4/2012 | Hatada | ................... | F25B 27/00 62/238.7 |
| 2012/0090560 A1 * | 4/2012 | Iwama et al. | ................... | 122/14.3 |
| 2013/0034344 A1 * | 2/2013 | Lutz et al. | ................... | 392/449 |
| 2013/0048745 A1 * | 2/2013 | Johnson, Jr. | ................... | F22B 35/00 237/8 A |
| 2013/0284818 A1 * | 10/2013 | Hayashida et al. | ................... | 237/56 |
| 2013/0299600 A1 * | 11/2013 | Beckers | ................... | F24H 1/185 237/8 A |
| 2014/0202549 A1 * | 7/2014 | Hazzard et al. | ................... | 137/3 |
| 2014/0203093 A1 * | 7/2014 | Young et al. | ................... | 237/8 A |
| 2015/0114313 A1 * | 4/2015 | Huang et al. | ................... | 122/14.1 |
| 2015/0204580 A1 * | 7/2015 | Evans | ................... | F24H 9/2007 122/14.1 |
| 2016/0033171 A1 * | 2/2016 | Mase | ................... | F24H 1/145 122/14.3 |

FOREIGN PATENT DOCUMENTS

| | | |
|---|---|---|
| JP | H03-011262 A | 1/1991 |
| JP | 2002-156101 A | 5/2002 |
| JP | 2002-250562 A | 9/2002 |
| WO | WO 2008-091970 A2 | 7/2008 |

OTHER PUBLICATIONS

Japanese Office Action dated Jul. 2, 2013.
Supplementary European Search Report mailed on Apr. 12, 2013.
English Language Abstract of JP H03-011261 A.
English Language Abstract of JP H03-011262 A.
English Language Abstract of JP 2002-156101 A.
English Language Abstract of JP 2002-250562 A.

* cited by examiner

METHOD FOR CONTROLLING A PARALLEL OPERATION OF A MULTI-WATER HEATER

TECHNICAL FIELD

The present invention relates to a method for controlling a parallel operation of a multi-water heater, and more particularly, to a method for controlling a parallel operation of a multi-water heater that can improve operation efficiency of the multi-water heater by using a temperature difference between a set temperature and a direct water, i.e. cold water, temperature.

BACKGROUND ART

In general, a multi-water heater is configured to have a capacity of a large-sized water heater by connecting a plurality of small-sized home water heaters in parallel. Everyone can manage the multi-water heater without a service man for water heater management unlike the large-sized water heater. Further, since the multi-water heater adopts the small-sized home water heater, the multi-water heater may be installed in a small space and easily maintained and managed. In addition, the multi-water heater is excellent in terms of energy saving because a plurality of water heaters are sequentially operated according to the amount of heat required for changing a temperature into a set temperature set by a user.

Sequentially operating the plurality of water heaters according to the amount of heat required that is changed according to the temperature set by the user is called a parallel operation.

In a method for controlling the parallel operation of the multi-water heater in the prior art, when each water heater is operated at a predetermined ratio (hereinafter, referred to as an 'operation reference value') or more of a capacity of each water heater, the stopped water heater is additionally operated and when each water heater is operated at a predetermined ratio (hereinafter, referred to as a 'stop reference value') or less of the capacity of each water heater, the operated water heater is additionally stopped.

However, when the operation reference value and the stop reference value are fixed at the time of operating the stopped water heater or stopping the operated water heater, an inefficient operation may be performed depending on the circumstance and conditions of use.

For example, when the water heater capacity is 48000 kcal/h, the operation reference value is 80% of the water heater capacity, and a temperature difference between a set temperature and a direct water temperature is approximately 13° C. (the set temperature is 43° C. and the direct water temperature is 30° C.), at least 49.2 liters of water per minute should be used as calculated below in order to additionally operate the stopped water heater.

$$\frac{48000 \text{ kcal/h}}{60 \text{ min} \cdot 13° \text{ C.}} = 49.2 \text{ l/min}$$

However, it is practically difficult that an amount of 49 liters of water flows through one water heater per minute. Accordingly, when the temperature difference between the set temperature and the direct water temperature is 13° C. and the operation reference value is 80% or more of the water heater capacity, the water heater is not additionally operated even though the stopped water heater needs to be additionally operated at the time of controlling the parallel operation of the multi-water heater, and as a result, the multi-water heater is inefficiently operated.

DISCLOSURE

Technical Problem

The present invention is contrived to solve the problem and provides a method for controlling a parallel operation of a multi-water heater which enables the multi-water heater to be efficiently operated depending on circumstances and conditions of use at the time of controlling the parallel operation of the multi-water heater.

Technical Solution

In order to achieve the above object, a method for controlling a parallel operation of a multi-water heater in which a plurality of water heaters are connected to each other in parallel according to an embodiment of the present invention comprises: measuring the temperature of direct water that flows into the multi-water heater; sensing a set temperature set by a user; calculating a temperature difference between the set temperature and the direct water temperature; changing an operation reference value to additionally operate each water heater and a stop reference value to additionally stop each water heater according to the calculated temperature difference; and controlling the parallel operation of the multi-water heater based on the changed operation reference value and stop reference value.

Further, at least one water heater may be additionally operated or stopped according to the calculated temperature difference.

In addition, the operation reference value and the stop reference value may be changed linearly in proportion to the calculated temperature difference.

Moreover, the operation reference value may include a first operation reference value as a reference value to additionally operate one water heater and a second operation reference value as a reference value to additionally operate two water heaters, and a gradient of the first operation reference value may be larger than that of the second operation reference value.

Advantageous Effects

By a method for controlling a parallel operation of a multi-water heater according to an embodiment of the present invention, even though the circumstance and conditions of the multi-water heater use are changed, an operation reference value and a stop reference value are changed by using a temperature difference between a set temperature and a direct water temperature, thereby improving efficiency during the parallel operation of the multi-water heater.

| Reference Numbers | |
|---|---|
| 2: Direct water inlet | 4: Hot water outlet |
| 5: First temperature sensor | 10: Multi-water heater |
| 30: Second temperature sensor | 40: Flow sensor |
| 50: Hot water controlling unit | 60: Hot water temperature setting unit |

BEST MODE

Hereinafter, a method for controlling a parallel operation of a multi-water heater according to an embodiment of the present invention will be described in detail with reference to the accompanying drawings.

Figure 1:
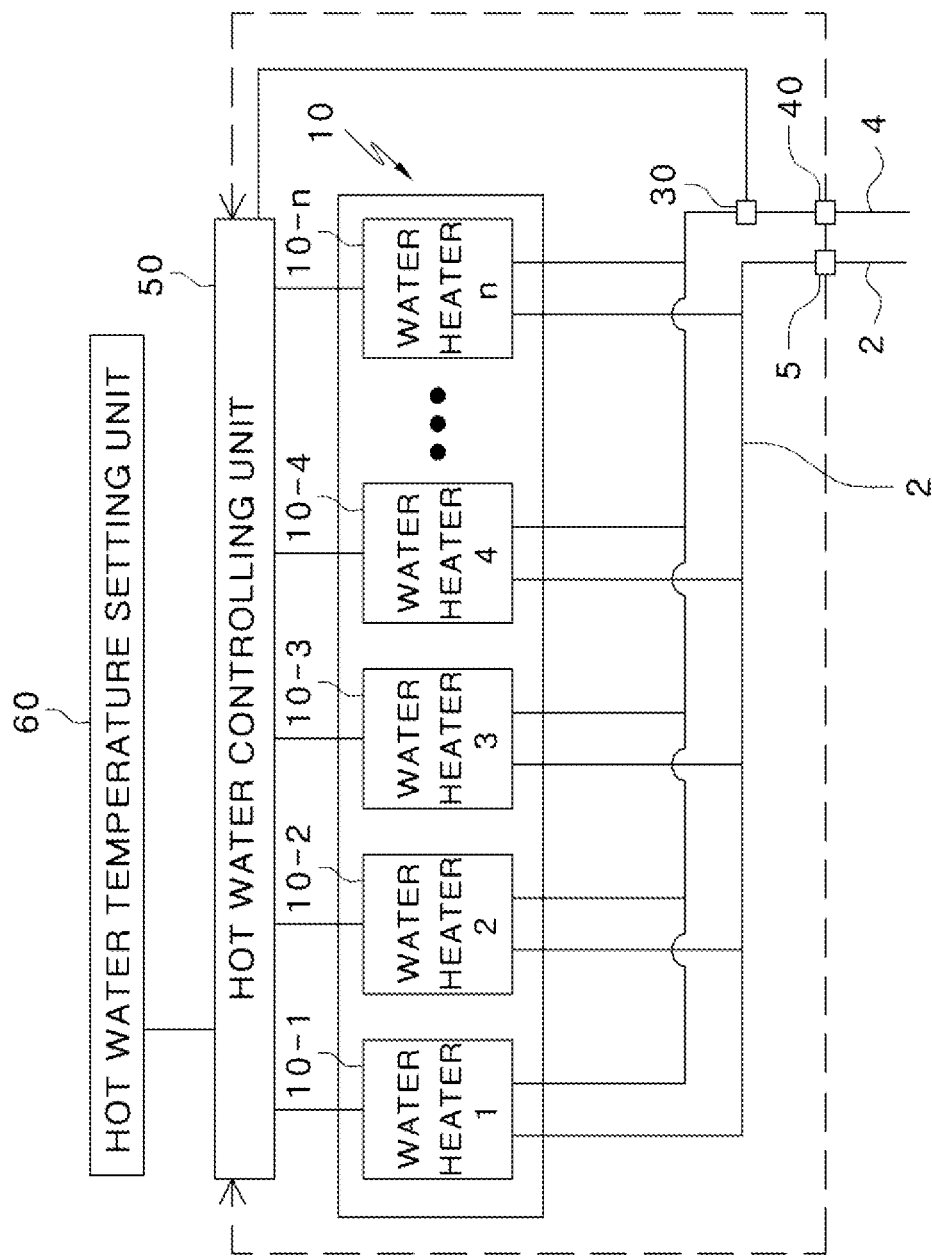
FIG. 1 is a schematic diagram of a multi-water heater using a method for controlling a parallel operation of the multi-water heater according to an embodiment of the present invention.

FIG. 1 is a diagram illustrating a multi-water heater using a method for controlling a parallel operation of the multi-water heater according to an embodiment of the present invention.

As shown in FIG. 1, a direct water inlet 2 and a hot water outlet 4 are commonly connected to first to n-th individual water heaters, 10-1 to 10-n, of the multi-water heater 10. A first temperature sensor 5 is provided at the direct water inlet 2 to measure the temperature of direct water that enters the direct water inlet 2 and a second temperature sensor 30 is provided at the hot water outlet 4 to measure the temperature of hot water. Meanwhile, the flow of the hot water used by a user is measured by a flow sensor 40 installed at the hot water outlet 4.

In addition, a hot water controlling unit 50 of the multi-water heater 10 receives an output value from the temperature sensor 30 and maintains the temperature of hot water of a hot water tank to a set hot water temperature by selectively operating the first to n-th water heaters, 10-1 to 10-n, of the multi-water heater 10 in advance according to the set hot water temperature, thereby controlling the hot water temperature to be constant at all times.

Meanwhile, the multi-water heater 10 shown in FIG. 1 changes an operation reference value as a reference to additionally operate a stopped water heater and a stop reference value as a reference to additionally stop an operated water heater according to a temperature difference between the set temperature set by the user and the direct water temperature that flows into the multi-water heater 10.

More specifically, the operation reference value may be divided into a first operation reference value as a reference value to additionally operate one water heater and a second operation reference value as a reference value to additionally operate two water heaters according to the temperature difference between the set temperature and the direct water temperature.

Figure 2:
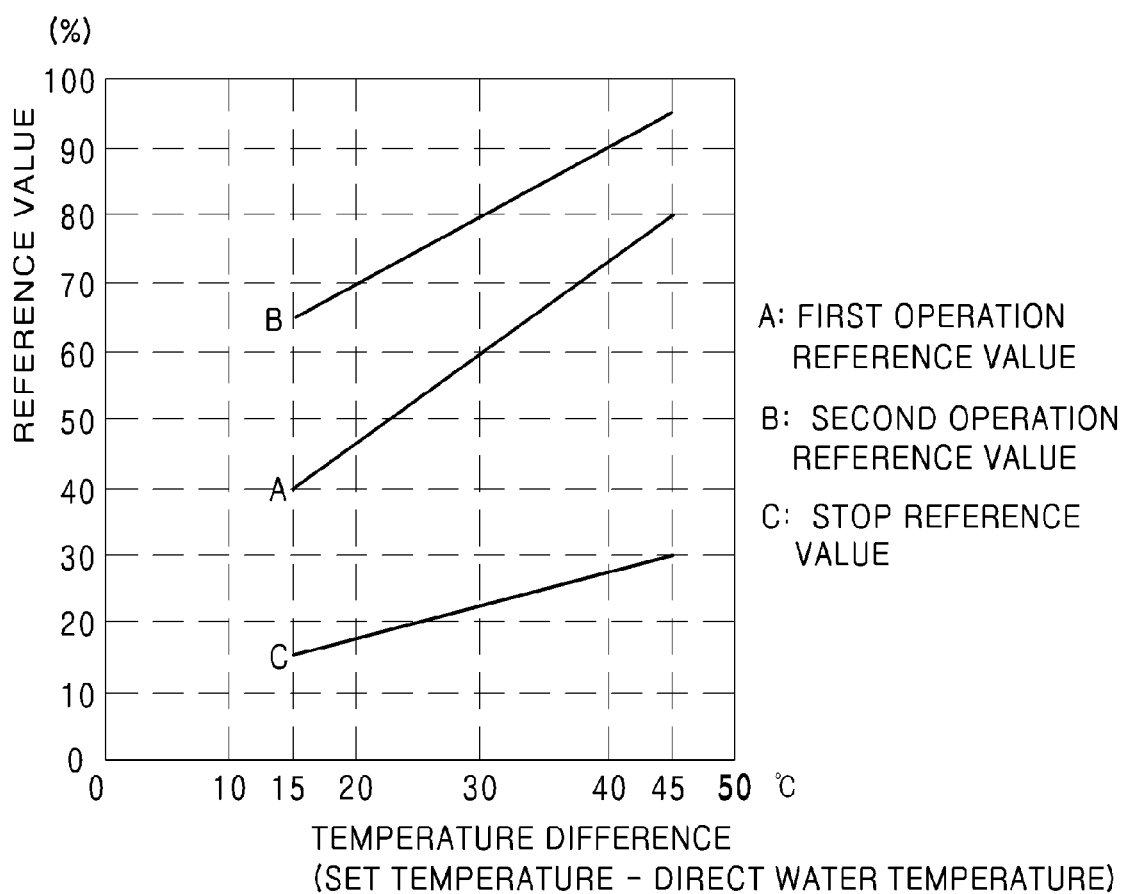
FIG. 2 is a graph illustrating changes in an operation reference value and a stop reference value according to a temperature difference between a set temperature and a direct water temperature in the multi-water heater shown in FIG. 1.

FIG. 2 is a graph illustrating changes in the first and second operation reference values and the stop reference value according to the temperature difference between the set temperature and the direct water temperature at the time of controlling the parallel operation of the multi-water heater 10 shown in FIG. 1.

In the embodiment, two operation reference values and one stop reference value are set, but more than two operation reference values and stop reference values may be set.

The first and second operation reference values and the stop reference value are changed linearly in proportion to the temperature difference between the set temperature and the direct water temperature. Further, a gradient of the first operation reference value is set to be larger than that of the second operation reference value.

Hereinafter, three methods for controlling the parallel operation of the multi-water heater 10 shown in FIG. 1 will be described in detail.

First, one water heater is additionally operated according to the temperature difference between the set temperature and the direct water temperature. At this time, the first operation reference value to additionally operate one water heater according to the temperature difference between the set temperature and the direct water temperature is changed linearly along line A in the graph shown in FIG. 2.

The following table shows the first operation reference value at several points when the temperature difference between the set temperature and the direct water temperature is changed from 15° C. to 45° C.

TABLE 1

| | Direct water temperature difference | | | | | | |
|---|---|---|---|---|---|---|---|
| | 15° C. | 20° C. | 25° C. | 30° C. | 35° C. | 40° C. | 45° C. |
| Reference value | 40% | 46.7% | 53.3% | 60% | 66.7% | 73.3% | 80% |

Second, two water heaters are additionally operated according to the temperature difference between the set temperature and the direct water temperature. At this time, the second operation reference value to additionally operate two water heaters according to the temperature difference between the set temperature and the direct water temperature is changed linearly along line B in the graph shown in FIG. 2.

The following table shows the second operation reference value at several points when the temperature difference between the set temperature and the direct water temperature is changed from 15° C. to 45° C.

TABLE 2

| | Direct water temperature difference | | | | | | |
|---|---|---|---|---|---|---|---|
| | 15° C. | 20° C. | 25° C. | 30° C. | 35° C. | 40° C. | 45° C. |
| Reference value | 65% | 70% | 75% | 80% | 85% | 90% | 95% |

Third, one water heater is additionally stopped according to the temperature difference between the set temperature and the direct water temperature. At this time, the stop reference value to additionally stop one water heater according to the temperature difference between the set temperature and the direct water temperature is changed linearly along line C in the graph shown in FIG. 2.

TABLE 3

| | Direct water temperature difference | | | | | | |
|---|---|---|---|---|---|---|---|
| | 15° C. | 20° C. | 25° C. | 30° C. | 35° C. | 40° C. | 45° C. |
| Reference value | 15% | 17.5% | 20% | 22.5% | 25% | 27.5% | 30% |

Figure 3:
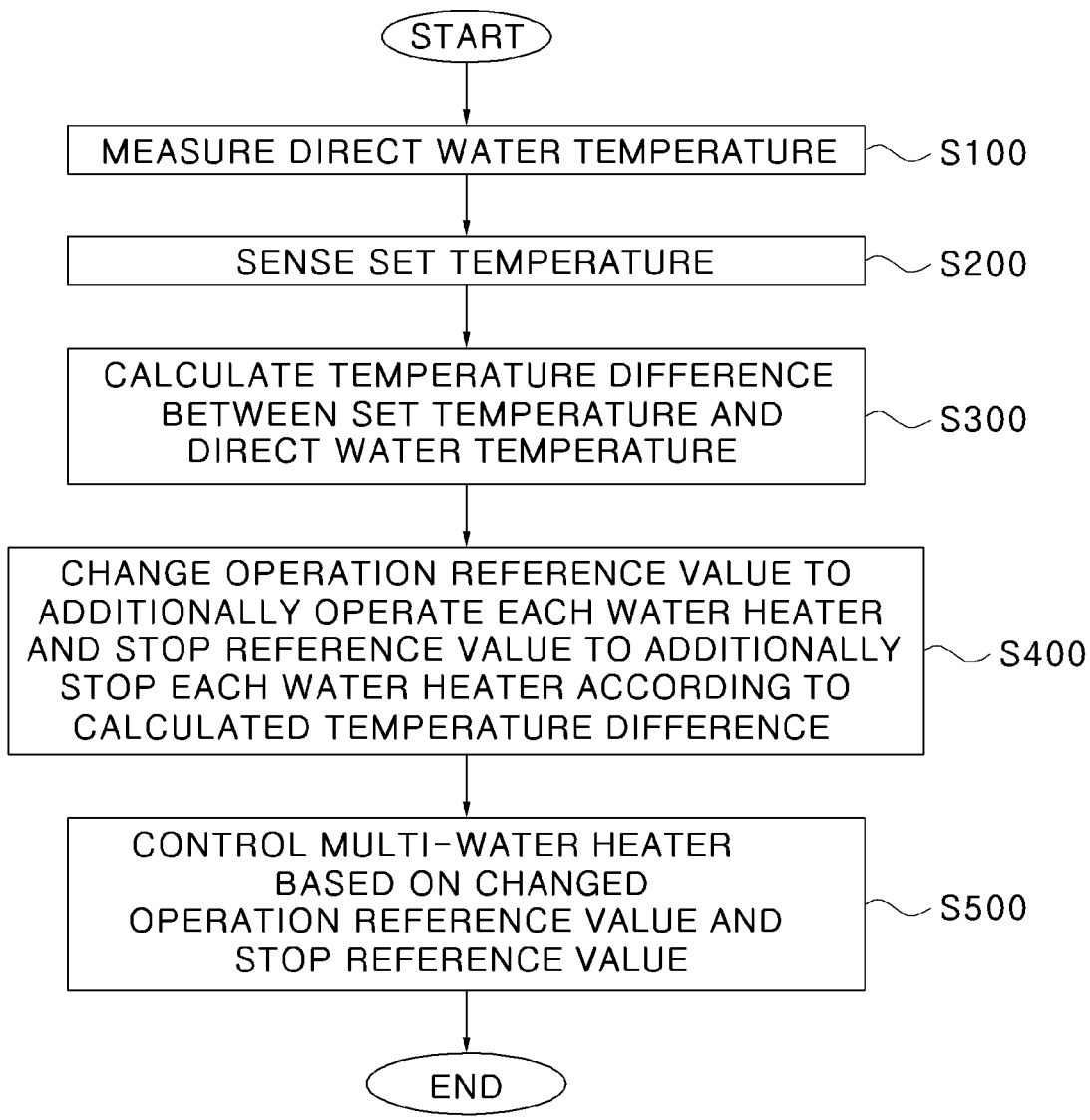
FIG. 3 is a flowchart illustrating the method for controlling a parallel operation of a multi-water heater according to the embodiment of the present invention.

Next, the method for controlling the parallel operation of the multi-water heater according to the embodiment of the present invention will be described in detail with reference to FIG. 3.

When power is applied to the multi-water heater 10 which is operated, the first temperature sensor 5 measures the temperature of the direct water from the direct water inlet 2 (S100). As such, the temperature value of the direct water measured by the first temperature sensor 5 is sent to the hot water controlling unit 50.

Next, when the user sets the temperature of hot water through the hot water temperature setting unit 60, the set temperature is sent to the hot water controlling unit 50, and as a result, the hot water controlling unit 50 senses the set temperature (S200).

Next, the hot water controlling unit 50 calculates a temperature difference between the set temperature sent from the hot water temperature setting unit 60 and the direct water temperature sent from the first temperature sensor 5 (S300).

Next, the operation reference value to additionally operate each water heater and the stop reference value to additionally stop each water heater are changed according to the calculated temperature difference (S400).

The hot water controlling unit 50 controls the parallel operation of the multi-water heater based on the changed operation reference value and stop reference value (S500). At this time, two or more water heaters may be additionally operated concurrently according to the temperature difference between the set temperature and the direct water temperature.

As described above, the operation reference value and the stop reference value are changed according to the temperature difference between the set temperature and the direct water temperature to efficiently operate the multi-water heater even though the circumstance and conditions of use are changed.

What is claimed is:

1. A method for practically controlling a multi-water heater in which a plurality of water heaters are connected to each other in parallel, the method comprising:
    defining first reference values and second reference values which are ratios to a capacity of the multi-water heater, wherein the first reference values and the second reference values are defined to be changed in proportion to a temperature difference between an inflow water temperature and a set temperature, the first reference values and the second reference values are defined to be linearly increased as the temperature difference is increased, and at a same temperature difference, the first reference values are defined to be greater than the second reference values,
    measuring, by a temperature sensor, the temperature of inflow water that flows into the multi-water heater;
    receiving, by a controller, the set temperature set by a user;
    calculating, by the controller, the temperature difference between the set temperature and the inflow water temperature;
    determining, among the first reference values, a value corresponding to the calculated temperature difference as an operation reference value to additionally operate at least one of the plurality of water heaters and also, determining, among the second reference values, a value corresponding to the calculated temperature difference as a stop reference value to additionally stop at least one of the plurality of water heaters; and
    controlling the multi-water heater, by the controller, so as to additionally operate a stopped water heater when an operated water heater is operated at the determined operation reference value or more, and additionally stop an operated water heater when the operated water heater is operated at the determined stop reference value or less.

2. The method of claim 1, wherein the first reference values include first operation reference values to additionally operate one water heater and second operation reference values to additionally operate two water heaters, and a gradient of the first operation reference values is larger than that of the second operation reference values.

\* \* \* \* \*